2 Sheets—Sheet 1.

M. HALLENBECK.
HORSE HAY RAKE.

No. 278,538. Patented May 29, 1883.

WITNESSES.
J. Snowden Bell
J. Walter Douglass

INVENTOR.
Martin Hallenbeck.
by Henry Baldwin Jr
Atty.

N. PETERS, Photo-Lithographer, Washington, D. C.

M. HALLENBECK.
HORSE HAY RAKE.
No. 278,538. Patented May 29, 1883.
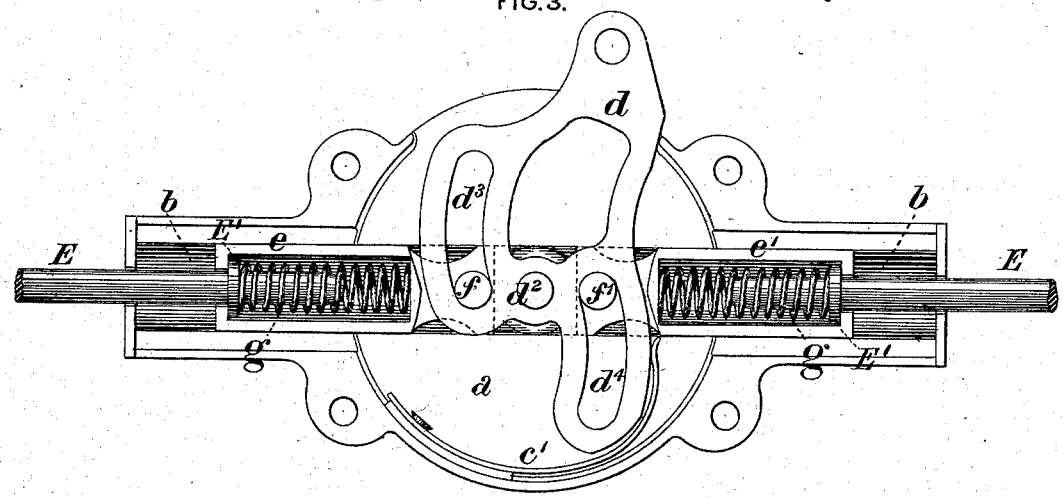
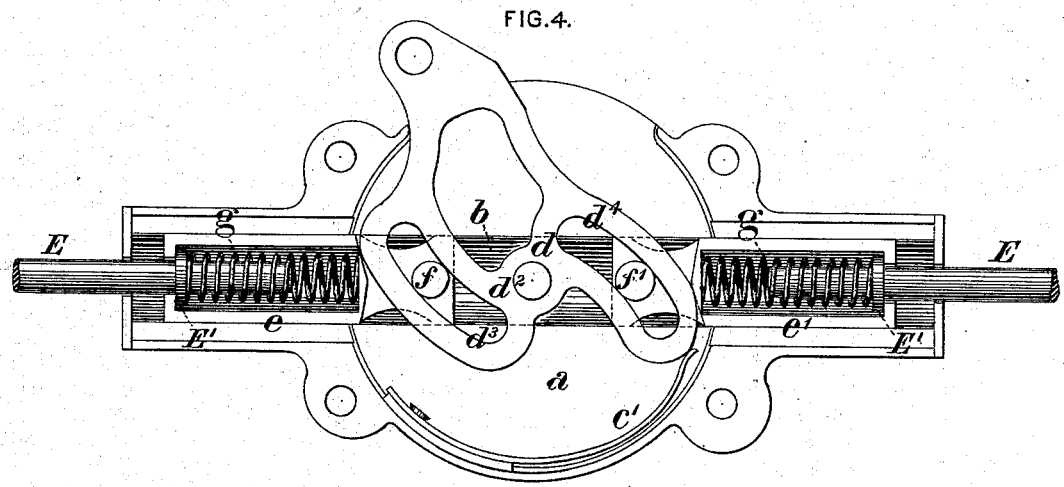
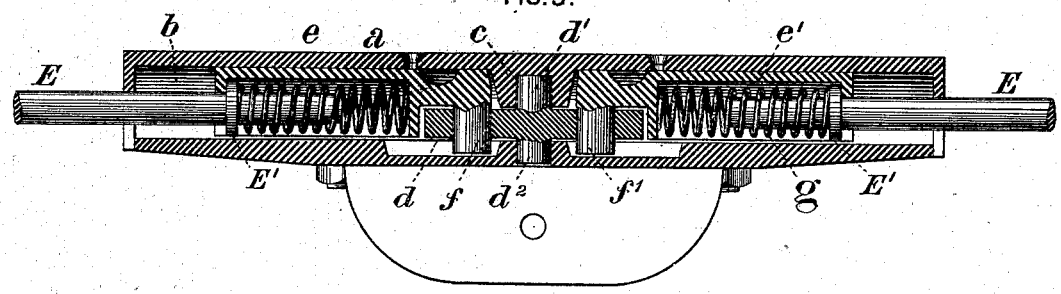

UNITED STATES PATENT OFFICE.

MARTIN HALLENBECK, OF ALBANY, NEW YORK.

HORSE HAY-RAKE.

SPECIFICATION forming part of Letters Patent No. 278,538, dated May 29, 1883.

Application filed May 19, 1879.

*To all whom it may concern:*

Be it known that I, MARTIN HALLENBECK, of Albany, in the county of Albany and State of New York, have invented certain new and useful Improvements in Horse Hay-Rakes, of which improvements the following is a specification, reference being had to the accompanying drawings, which make part thereof.

It is the object of my invention to provide a simple and effective automatic device for raising the teeth of a horse hay-rake from the ground at intervals, as required, to discharge the gathered hay, to be used in connection with an automatic device for lowering the rake-teeth after the gathered hay has been discharged, so that the driver has only to determine the intervals between the discharges, and is relieved from the labor of lifting and lowering the teeth; and to these ends my invention consists in combining with a two-wheel horse hay-rake a device which I designate as a "switch," the operation of the switch being such that the driver by moving a lever sets the switch, and the forward movement of the machine raises the teeth, so as to discharge the gathered hay, when a tripping-horn, at the proper moment, releases the rake-teeth and permits them to resume their gathering position.

Figure 1:
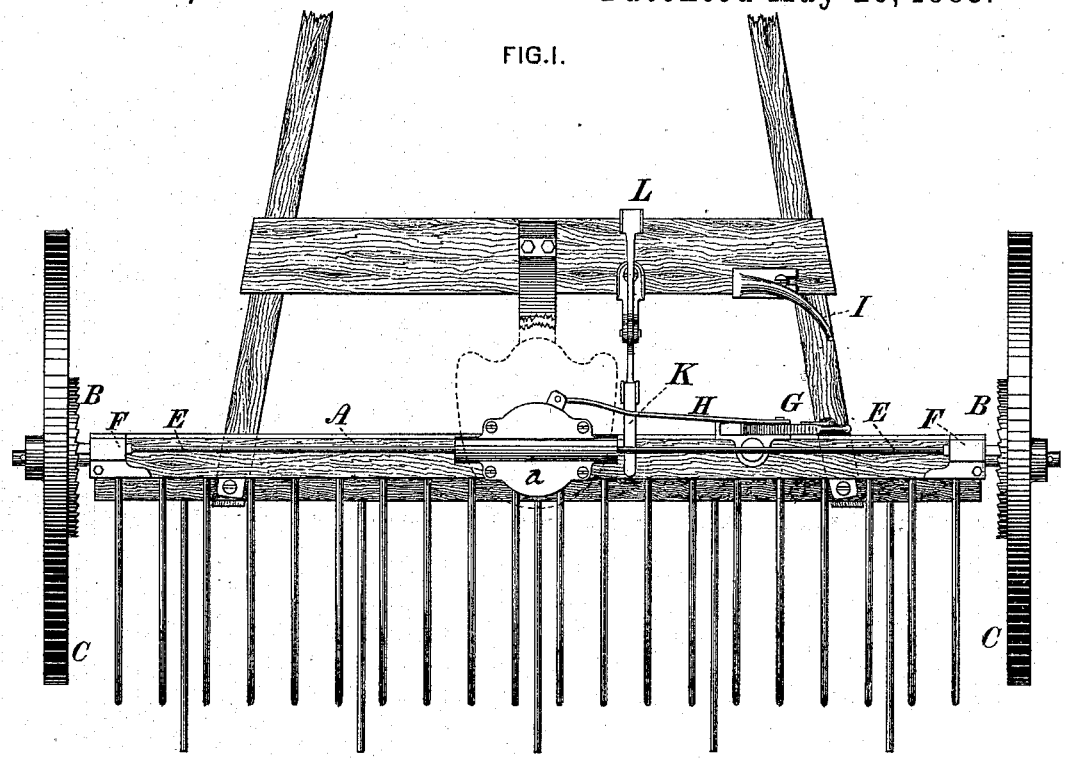
Figure 2:
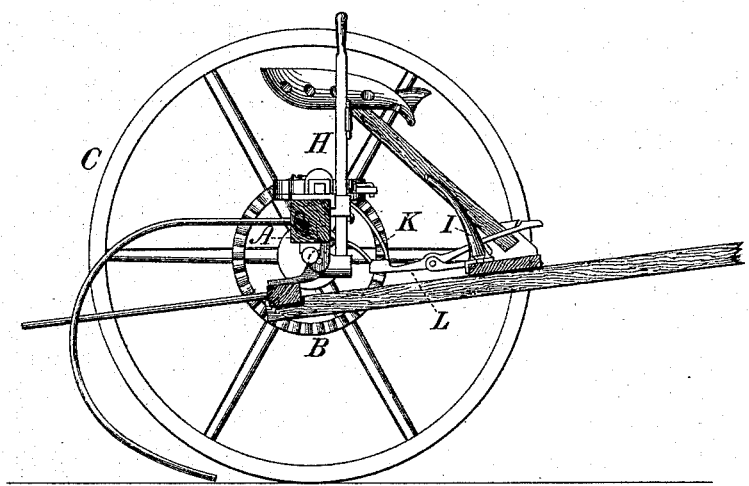

In the accompanying drawings I have shown my improvements applied to a two-wheel horse hay-rake, having a frame upon which the rake head or bar to which the rake-teeth are attached is mounted in pivoted bearings, the axles of the carrying-wheels being secured to the rake-head; and of this machine Figure 1 is a plan or top view; Fig. 2, a side view in elevation, the wheel nearest the observer being removed to show the construction more clearly; Fig. 3, a plan view, on an enlarged scale, of the switch inverted, showing its parts in their position when the teeth are down; Fig. 4, a similar view of the same, also inverted, showing the position of the parts when set for raising the teeth; and Fig. 5, a vertical central section through the switch, the parts being in the position shown by Fig. 3.

So far as regards the general construction of the machine, the details may be varied; but the teeth, however secured, must be connected to a rocking head, A, which extends across the frame and to within a short distance of each of the ratchet-rings B, interposed between the carrying-wheels C and the ends of the head A.

The switch is mounted centrally on the head A, and the switch-rods E extend along the rake-head from points within the case of the switch to points slightly beyond the ends of the head A, the inner ends of these rods being operated as hereinafter described, and their outer ends, which act as locking-pawls, being guided in boxes F, secured on the ends of the head A, which boxes also support the pawl ends of the rods when engaged with the teeth of the rings B. These movements of the rods E are effected by means of the lever G and link H, connecting the lever with the switch-block, the rods being moved outward or protruded by the driver pushing the lever G away from the switch-case, and the withdrawal of the rods being automatically effected by the tripping-horn I, located upon the frame of the machine at the proper point and adjusted for tripping the lever at the proper time. These rods E act independently of each other, thereby permitting the apparatus to work on curves without tripping the pawls prematurely.

The switch is composed of a cast-iron box, $a$, having a circular center with tubular projections, the circular center being open in front, and the tubular projections having openings at their ends, and the two parts of the box being secured together by bolts and nuts. The inner face of the bed plate or bottom of the box is simply provided with such depressions or recesses and projections or flanges as will inclose those parts of the mechanism which project beyond the surfaces of the upper part of the case, as shown in Fig. 5. The upper part of the box $a$ has a circular recess, across which a longitudinal groove, $b$, extends from end to end of the box. In the center of this groove is a socket, $c$, and along the back of the circular recess is a steel spring, $c'$, which performs the function of holding the switch-block in either of the positions shown in Figs. 3 and 4, the bearing of the spring in Fig. 3 being, as shown, such as to prevent any tendency of the switch-block to be swung on its center by jolts or inclinations of the machine, as but for the spring it would be, and in the position shown in Fig. 4 the spring serves as effectually to prevent the switch from being tripped by similar causes, and keeps it in position, so as to prevent the pawls from being jolted out of the toothed rings before the switch is tripped. Cast-iron troughs $e\ e'$ are fitted into the groove $b$, on each side of the socket, the troughs having upright pins $f f'$ in them, spaces being left between these pins and the ends of the troughs, in which spaces the switch-block fits, as presently to be described. The outer ends of the troughs have openings corresponding with the open ends of the case $a$. The troughs must be fitted in the groove, so as to slide freely along it. Each of the switch-rods E has a collar, E', near its inner end, and this end of the rod lies in the trough $e$, with the collar against the sides of the opening in the trough, where it is held by a coiled spring, $g$.

The switch-block $d$, Figs. 3, 4, and 5, is cast in the form shown in the drawings, with pins $d'\ d^2$ on its respective sides, and slots $d^3\ d^4$, curved in opposite directions on each side of the center-pins $d'\ d^2$. The front of the switch-block is prolonged, so that it will protrude through the opening in the center of the case, and the block rests in the central circular recess of the case, with the pin $d'$ in the socket $c$, the pin $d^2$ having a corresponding bearing in the bed-plate, while the slot $d^3$ fits over the pin $f$, and the slot $d^4$ over the pin $f'$. This position of these parts is shown in Figs. 3 and 5, in which it will be seen that the switch-block rests upon the face of the circular recess, its front protruding through the opening, and its center being pivoted in the socket and in the bed-plate, its back edge being borne upon by the spring $c'$ while the troughs are drawn back in the groove, and held close to the socket in the curved slots $d^3\ d^4$, the rods E being retracted correspondingly, so that their pawl ends do not engage with the teeth on the rings B.

The change of position necessary for protruding the rods and engaging their pawl ends with the teeth in the rings B is shown in Fig. 4, and this change is effected by swinging the switch-block on its center across the opening in the front of the case $a$, with which movement the pin $f$ moves along the curved slot $d^3$ and the pin $f'$ along the curved slot $d^4$, sliding the troughs along the groove away from the center and protruding the rods E, so that their pawl ends engage with the teeth in the rings B. This last-described movement of the switch-block is effected through the lever G and link-rod H by the driver, as already described. When thus protruded and engaged with the teeth of the rings B, the pawl ends of the rods E of course lock the rake-head to the carrying-wheels, so that with the further advance of the machine the rake-head is turned on its pivots, raising the teeth, and to disengage the teeth at the desired point in this revolution the tripping-horn I is so located upon the frame of the machine that a small friction-roller upon the side of the lever will strike upon and follow the inclined surface of the tripping-horn until the lever is thrown back toward the driver, thereby reversing the switch-block and restoring the parts to the position shown in Fig. 3, withdrawing the pawl ends from the rings and allowing the teeth to drop, as already described.

For cases in which it is desirable to hold the teeth in an elevated position when the pawls are not engaged with the rings B, I attach a loop, K, to the rake-head and a pivoted brake, L, to the frame, so that the driver, by turning the rake-head up and holding the brake against the loop with his foot, can keep the teeth suspended, and by reversing the brake, so that it shall bear against the loop when the teeth are down, the driver can hold the teeth down to the ground while the pawls are not engaged with the rings.

Having thus described the nature and objects of my invention, what I claim as new, and desire to secure by Letters Patent, is—

1. The combination, in a horse hay-rake, of the carrying-wheels provided with toothed rings, the pivoted rake-head provided with rake-teeth, the pivoted and slotted block, the switch-rods having a connection with the slots in the switch-block, and their outer ends adapted to directly engage the toothed ring and the lever pivoted on the rake-head for rotating the switch-block to cause the switch-rods to engage the toothed rings and rotate the rake-head, substantially as described.

2. The combination, in a horse hay-rake, of the carrying-wheels provided with toothed rings, the pivoted rake-head, the pivoted switch-block having oppositely-curved slots, the switch-rods both operated by the one switch-block, and a spring acting upon said block to hold it in either of its adjusted positions, substantially as described.

3. The combination of the carrying-wheels provided with toothed rings, the pivoted rake-head, the switch-block, the troughs, the coiled springs in the troughs, and the switch-rods having collars against which the outer ends of the coiled springs bear, substantially as described.

4. The combination of the switch-box having recesses in its bottom plate, the slotted switch-block, the troughs having pins projecting through the block into the recesses in the bottom plate of the switch-box, the switch-rods, and the coiled springs in the troughs, substantially as described.

5. The combination of the slotted switch-block, the troughs, the coiled springs within the troughs, and the switch-rods, substantially as set forth.

6. The combination of the carrying-wheels, the toothed rings, the pivoted rake-head, the slotted switch-block, the troughs, the coiled springs within the troughs, the switch-rods, and the lever for operating the switch-block.

MARTIN HALLENBECK.

Witnesses:
JOHN M. STAPLER,
EDW. H. GOURLEY.